(12) United States Patent
Binda et al.

(10) Patent No.: US 11,708,976 B2
(45) Date of Patent: Jul. 25, 2023

(54) COOKTOP ASSEMBLY

(71) Applicant: WHIRLPOOL CORPORATION, Benton Harbor, MI (US)

(72) Inventors: Edoardo Binda, Varese (IT); Francesca Partegiani, Varese (IT); Gaetano Mungo, Caserta (IT)

(73) Assignee: Whirlpool Corporation, Benton Harbor, MI (US)

( * ) Notice: Subject to any disclaimer, the term of this patent is extended or adjusted under 35 U.S.C. 154(b) by 101 days.

(21) Appl. No.: 16/886,223

(22) Filed: May 28, 2020

(65) Prior Publication Data

US 2021/0372628 A1 Dec. 2, 2021

(51) Int. Cl.
*F24C 7/08* (2006.01)
*H05B 3/74* (2006.01)
*F16B 1/00* (2006.01)

(52) U.S. Cl.
CPC .............. *F24C 7/086* (2013.01); *H05B 3/74* (2013.01); *F16B 2001/0035* (2013.01)

(58) Field of Classification Search
CPC . F24C 7/086; F24C 15/10; H05B 3/74; H01F 7/02; H01F 7/0221
See application file for complete search history.

(56) References Cited

U.S. PATENT DOCUMENTS

| | | | |
|---|---|---|---|
| 6,198,079 B1 | 3/2001 | Essig | |
| 8,339,226 B2 * | 12/2012 | Fullerton | G09F 7/04 335/285 |
| 8,835,814 B2 | 9/2014 | Apetauer et al. | |
| 2001/0008237 A1 | 7/2001 | Essig | |
| 2005/0008458 A1 * | 1/2005 | Keech | F16B 5/0657 411/555 |
| 2010/0012647 A1 | 1/2010 | Baier et al. | |
| 2012/0256715 A1 * | 10/2012 | Fullerton | H01F 7/04 335/285 |
| 2019/0090629 A1 * | 3/2019 | Roux | |

(Continued)

FOREIGN PATENT DOCUMENTS

| | | |
|---|---|---|
| DE | 102006028889 B3 | 7/2007 |
| DE | 202019005361 U1 | 5/2020 |
| DE | 202019005361 U1 * | 6/2020 ........... A47B 77/022 |

(Continued)

OTHER PUBLICATIONS

Samsung Global Newsroom, "Why the Chef Collection Induction Range is Right for Your Kitchen", Jun. 26, 2015 (Year: 2015).*

*Primary Examiner* — William J Levicky
*Assistant Examiner* — Bryan M Badalamenti
(74) *Attorney, Agent, or Firm* — Price Heneveld LLP

(57) ABSTRACT

A cooktop for a cooking appliance includes a cooking panel that has a first edge. A support feature is coupled to the cooking panel proximate the first edge. The cooking panel is disposed on the support feature. The support feature and the cooking panel define a cavity. A human-machine interface is coupled to an underside of the cooking panel. The human-machine interface is disposed within the cavity and adjacent to the support feature. A magnet assembly is coupled to the cooking panel and the human-machine interface. The magnet assembly is configured to retain the human-machine interface in a selected position on the underside of the cooking panel.

20 Claims, 6 Drawing Sheets

(56) References Cited

U.S. PATENT DOCUMENTS

2019/0150607 A1    5/2019  Roux et al.
2022/0022288 A1*   1/2022  Guedon ................ F24C 15/108

FOREIGN PATENT DOCUMENTS

| EP | 2260751 A1 | 12/2010 |
| EP | 2420733 A2 | 2/2012 |
| EP | 2658341 A2 | 10/2013 |
| EP | 2483601 B1 | 7/2018 |

* cited by examiner

COOKTOP ASSEMBLY

BACKGROUND OF THE DISCLOSURE

The present disclosure generally relates to a cooktop, and more specifically, to a cooking appliance with a cooktop.

SUMMARY OF THE DISCLOSURE

According to one aspect of the present disclosure, a cooktop for a cooking appliance includes a cooking panel that has a first edge. A support feature is coupled to the cooking panel proximate the first edge. The cooking panel is disposed on the support feature. The support feature and the cooking panel define a cavity. A human-machine interface is coupled to an underside of the cooking panel. The human-machine interface is disposed within the cavity and adjacent to the support feature. A magnet assembly is coupled to the cooking panel and the human-machine interface. The magnet assembly is configured to retain the human-machine interface in a selected position on the underside of the cooking panel.

According to another aspect of the present disclosure, a cooktop assembly includes a cooking panel having a topside and an underside. A first magnet is coupled to the underside of the cooking panel. A human-machine interface has selectable features. The human-machine interface is disposed proximate the underside of the cooking panel. A second magnet is coupled to the human-machine interface. The second magnet is configured to mate with the first magnet to couple the human-machine interface to the cooking panel.

According to yet another aspect of the present disclosure, a method of manufacturing a cooktop assembly includes applying a film layer to an underside of a cooking panel. The film layer includes a first magnet. A film cover is applied to a topside of a human-machine interface. The film cover includes a second magnet. The second magnet is aligned with the first magnet. The human-machine interface is coupled to the cooking panel by engaging the second magnet with the first magnet.

These and other features, advantages, and objects of the present disclosure will be further understood and appreciated by those skilled in the art by reference to the following specification, claims, and appended drawings.

Figure 1:
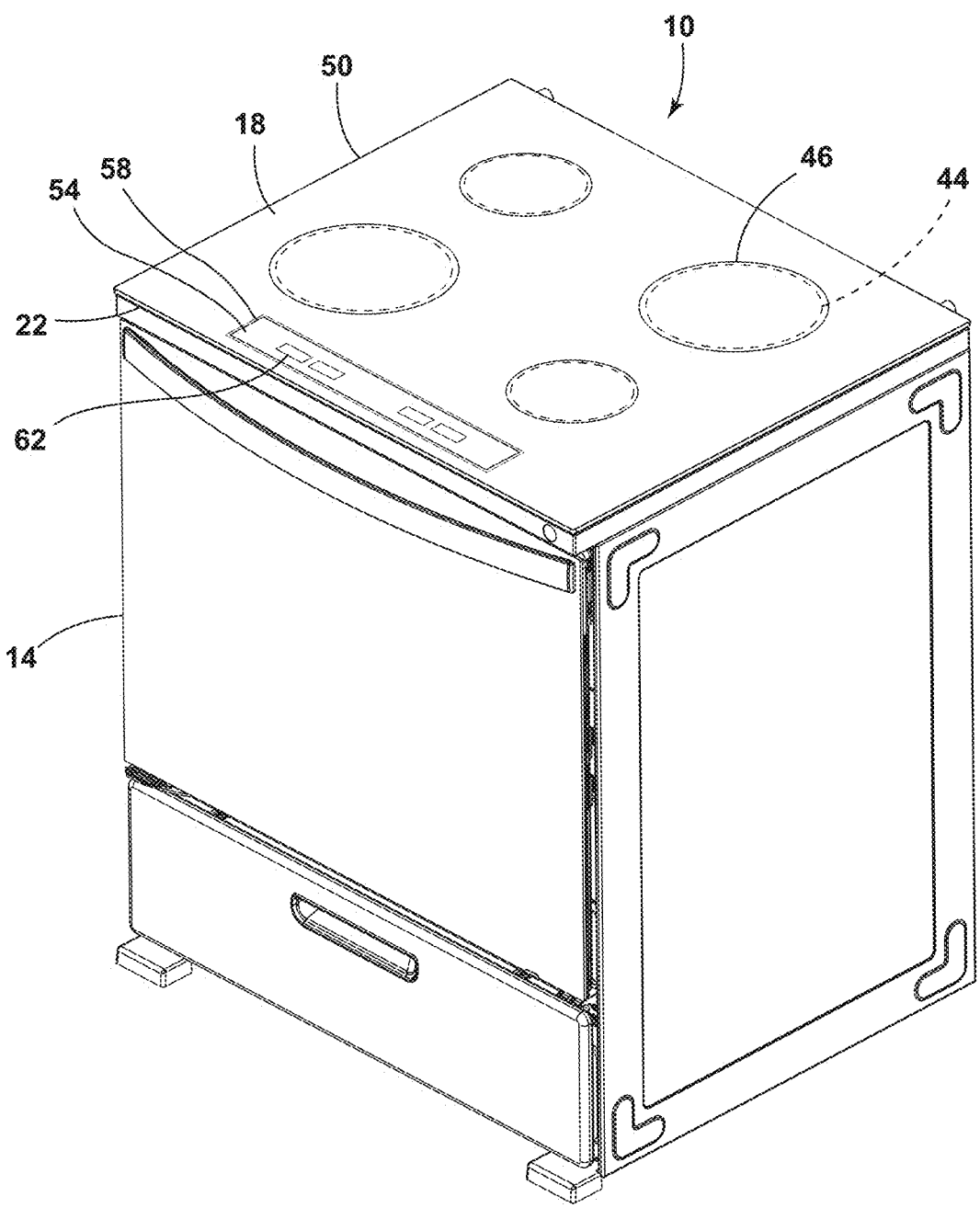
FIG. 1 is a front perspective view of a cooktop assembly of a cooking appliance, according to the present application.

The components in the figures are not necessarily to scale, emphasis instead being placed upon illustrating the principles described herein.

DETAILED DESCRIPTION

The present illustrated embodiments reside primarily in combinations of method steps and apparatus components related to a cooktop assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8 reference numeral 10 generally designates a cooktop assembly for a cooking appliance 14 that includes a cooking panel 18 that has a first edge 22. A support feature 26 is coupled to the cooking panel 18 proximate the first edge 22. The cooking panel 18 is disposed on the support feature 26. The support feature 26 and the cooking panel 18 define a cavity 30. A human-machine interface (HMI) 34 is coupled to an underside 38 of the cooking panel 18. The HMI 34 is disposed within the cavity 30 and adjacent to the support feature 26. A magnet assembly 42 is coupled to the cooking panel 18 and the HMI 34. The magnet assembly 42 is configured to retain the HMI 34 in a selected position on the underside 38 of the cooking panel 18.

Referring to FIG. 1, the cooktop assembly 10 is illustrated in combination with the cooking appliance 14. The cooking appliance 14 is illustrated as an oven having a single cooking cavity. It is contemplated that the cooktop assembly 10 can be combined with any practicable cooking appliance 14, such as a gas oven, an electric oven, a single oven, a double oven, other similar appliances in residential and commercial settings, and/or combinations thereof. Additionally or alternatively, the cooktop assembly 10 can be a freestanding cooktop disposed on a countertop or other similar structure.

The cooktop assembly 10 is illustrated as an electric cooktop. In such examples, the cooking panel 18 can be a glass panel, a ceramic panel, and/or a glass-ceramic panel. The cooktop assembly 10 may be a radiant cooktop or an induction cooktop. In radiant cooktop examples, cooking elements 44 configured as wire coils are disposed below the cooktop assembly 10. When activated by a user, electricity flows to the cooking elements 44 to heat the wire coils. The heat radiates through the cooking panel 18 of the cooktop assembly 10 and into a cooking member (e.g., a pot, a pan, etc.) disposed on the cooktop assembly 10. In induction cooktop examples, the cooking elements 44 are disposed below the cooking panel 18. The cooking elements 44 each function as a magnet. The cooking elements 44 generate a magnetic field, which causes the cooking member disposed on the cooking panel 18 to heat. More specifically, electromagnetic energy is transferred to a cooking vessel from the cooking elements 44. There is no thermal energy transfer to the cooking vessel, but instead there is a transfer of electromagnetic energy from the cooking elements 44 which is used to heat the cooking vessel.

Figure 2:
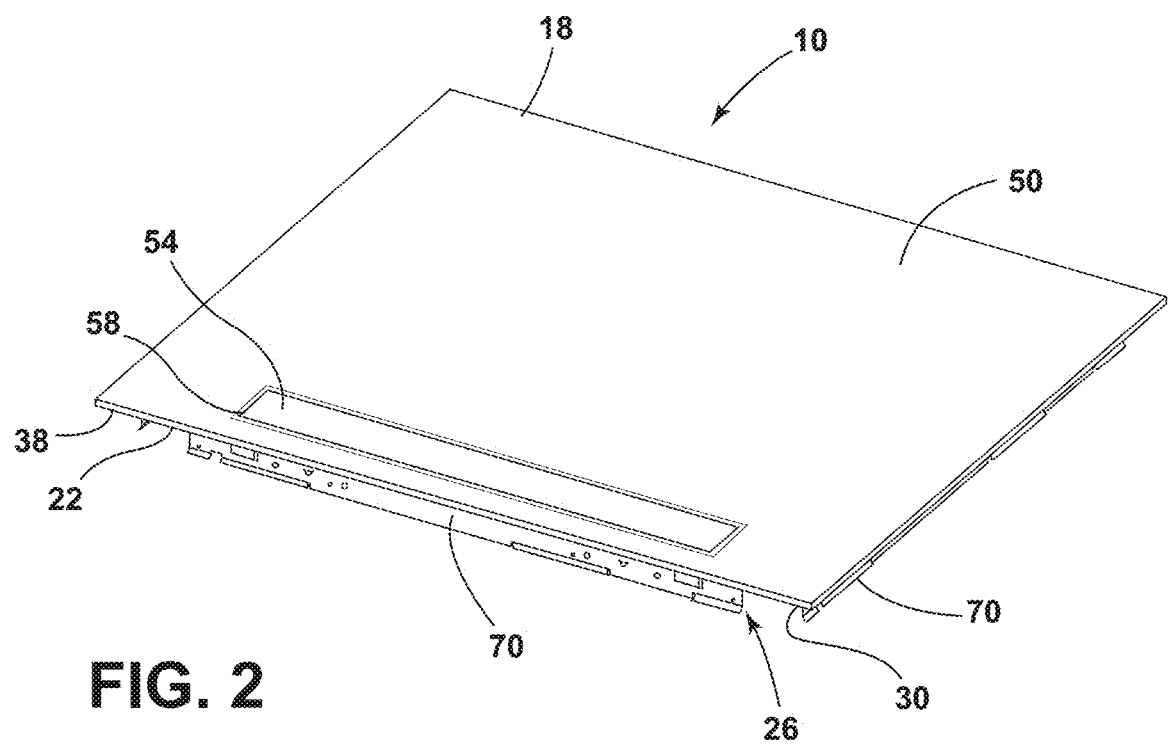
FIG. 2 is a top perspective view of a cooktop assembly, according to the present disclosure.

Referring still to FIGS. 1 and 2, the cooking panel 18 includes a plurality of cooking portions 46 that align with the cooking elements 44 disposed below the cooking panel 18. The cooking portions 46 may be identified to the user of the cooktop assembly 10 through markings or other identification on a topside 50 of the cooking panel 18. The markings may be advantageous to indicate what portions of the cooking panel 18 may be heated and/or where to place the cooking member. It is contemplated that the cooktop assembly 10 may be another type of cooktop, such as, for example, a gas cooktop, without departing from the teachings herein.

A user-interface 54 may be disposed proximate the first edge 22 of the cooking panel 18. A user can provide an input through the user-interface 54 to control various aspects of the cooktop assembly 10. The user-interface 54 is disposed proximate the front edge (e.g., the first edge 22) of the cooktop assembly 10 providing increased access for the user to control the cooktop assembly 10. The user-interface 54 may be spaced-apart from any cooking elements 44 of the cooktop assembly 10. The user-interface 54 can have any practicable configuration that allows the user to control the operation of the cooktop assembly 10 and/or the cooking appliance 14 without departing from the teachings herein.

The user-interface 54, as illustrated in FIG. 1, can be identified to the user via a border 58. Icons 62 that correspond to various functions of the cooktop assembly 10 can be disposed within the border 58. Alternatively, one or more of the icons 62 of the user-interface 54 can be disposed on the cooking panel 18 outside of the border 58. Further, the cooking panel 18 may be free of the border 58.

Figure 3:
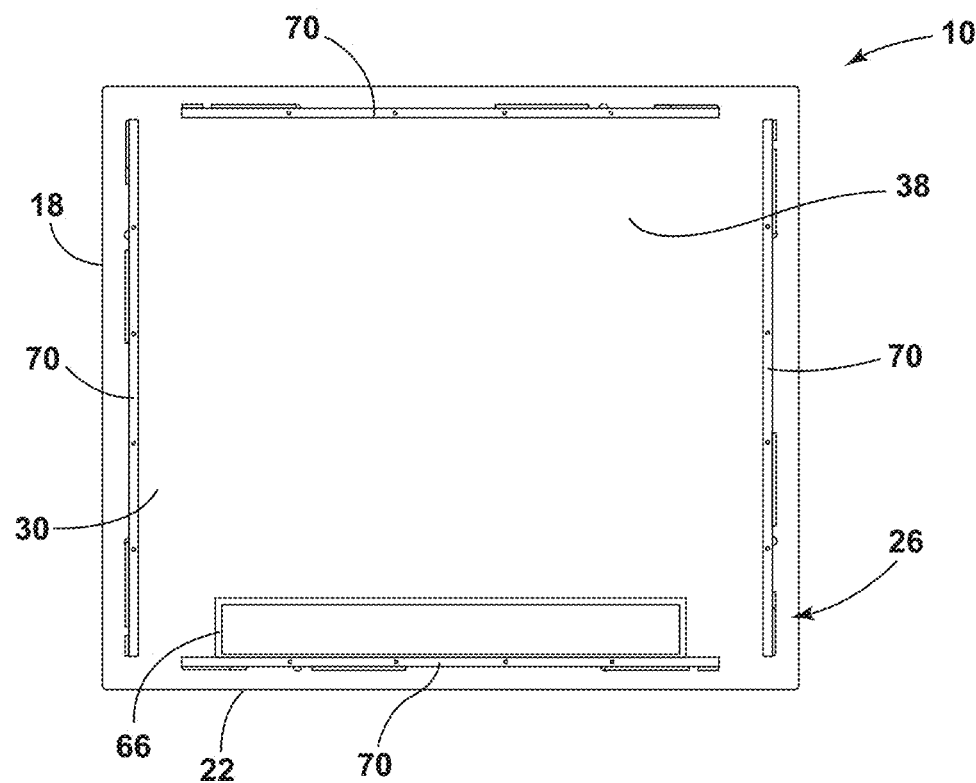
FIG. 3 is a bottom plan view of the cooktop assembly of FIG. 2.

Referring to FIGS. 1-3, the user-interface 54 extends along the first edge 22, which is generally the front edge of the cooking panel 18. A first magnet 66 is coupled to the underside 38 of the cooking panel 18. The first magnet 66 can generally align with the border 58 on the topside 50 of the cooking panel 18. The border 58 can provide a visual indication of the alignment of the user-interface 54 and the first magnet 66. Accordingly, the first magnet 66 is disposed proximate the first edge 22 of the cooking panel 18. The first magnet 66 may define a shape that corresponds with and matches the shape of the border 58.

According to various aspects, the support feature 26 is coupled to the underside 38 of the cooking panel 18. As illustrated in FIG. 3, the support feature 26 includes a plurality of elongate members 70. Each elongate member 70 extends along one of the sides of the cooking panel 18. Accordingly, the elongate member 70 is disposed adjacent to the first edge 22 of the cooking panel 18 and the first magnet 66. The support feature 26 is configured to engage the cooking appliance 14 to couple the cooktop assembly 10 to the cooking appliance 14. The cooktop assembly 10 is disposed on and supported by the support feature 26.

Figure 4:
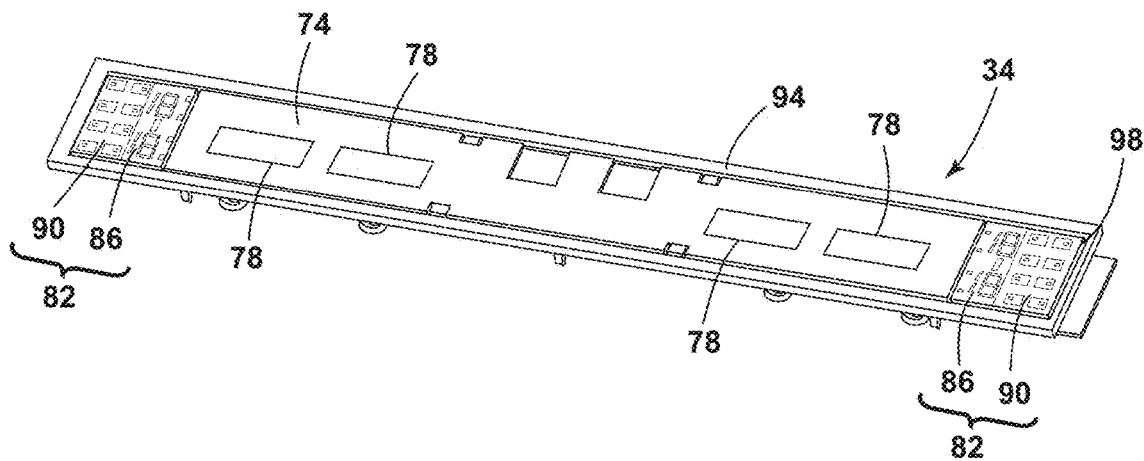
FIG. 4 is a top perspective view of a human-machine interface for a cooktop assembly, according to the present disclosure.

Referring to FIGS. 2 and 4, the cooking panel 18 and the support feature 26 define the cavity 30 adjacent to the underside 38 of the cooking panel 18. The cooking elements 44 (FIG. 1) can be disposed within the cavity 30 of the cooktop assembly 10. Additionally or alternatively, the HMI 34 can be disposed within the cavity 30. The HMI 34 includes a control panel 74. The control panel 74 includes selectable features 78 that correspond with various operations of the cooktop assembly 10. In a non-limiting example, the control panel 74 can include buttons or slides. When the buttons or slides (e.g., the selectable features 78) are manipulated, the corresponding operation of the cooktop assembly 10 can be controlled. In another non-limiting example, the control panel 74 may be configured as a touch panel. The touch panel may be, for example, a capacitive touch panel. The capacitive touch panel can be a surface capacitive touch panel, a projected capacitive touch panel, and/or a combination thereof. In such examples, the touch panel can include electrodes arranged in a pattern. Accordingly, the selectable features 78 can correspond with specific locations defined by the electrode pattern of the touch panel.

According to various aspects, the HMI 34 may include indicator lights 82 disposed on one side or both opposing sides of the control panel 74. In a non-limiting example, the indicator lights 82 can be one or more segmented LCDs 86. Segmented LCDs 86, also referred to as static displays or glass-only displays, are generally constructed of two pieces of indium tin oxide (ITO) glass with a twisted nematic fluid disposed between the two ITO glass pieces. Each segment of the segmented LCDs 86 may be one or more lines, segments, and/or symbols that can each be activated and deactivated independently. In certain aspects, the indicator lights 82 may be at least partially configured as a seven segment LCD 86, which can have seven independently controlled segments configured to display numbers and letters of the alphabet. In examples where the indicator lights 82 form letters of the alphabet, fourteen segment LCDs 86 may be used to provide all 26 letters of the alphabet. In the cooktop assembly 10, the segmented LCD 86 may be advantageous for displaying numbers for timing cooking operations and conveying similar information to the user.

Additionally or alternatively, the indicator lights 82 may include additional light sources 90. The additional light sources 90 may emit visible light that has a wavelength in a range of from about 380 nm to about 740 nm. The light sources 90 may include any form of light source, for example, fluorescent lighting, light-emitting diodes LEDs, organic LEDs (OLEDs), polymer LEDs (PLEDs), laser diodes, quantum dot LEDs (OD-LEDs), solid-state lighting, a hybrid, and/or any other similar device. Any other form of lighting may be utilized within the cooktop assembly 10. Further, various types of LEDs are suitable for use as the additional light sources 90, including, but not limited to, top-emitting LEDs, side-emitting LEDs, and others. Moreover, according to various examples, multicolored light sources such as Red, Green, and Blue (RGB) LEDs that employ red, green, blue LED packaging, which can be used to generate various desired colors of light outputs from a single light source, according to known plate color mixing techniques. The additional light sources 90 may indicate a status of the cooktop assembly 10, the cooking elements 44, or any other aspect of the cooking appliance 14 (FIG. 1).

The indicator lights 82 may be disposed on or otherwise coupled to one or more circuits or circuit boards. In circuit board examples, the one or more circuit boards may be printed circuit boards, which can be configured as flexible or rigid printed circuit boards. In the depicted example of FIG. 4, the HMI 34 includes the centrally located control panel 74, segmented LCDs 86 disposed on opposing sides of the control panel 74, and additional light sources 90 disposed adjacent to each of the segmented LCDs 86.

Referring to FIGS. 3 and 4, a second magnet 94 is coupled to a topside 98 of the HMI 34. As illustrated, the second magnet 94 defines a rectangular shape that extends around a perimeter of the HMI 34, including the control panel 74 and the indicator lights 82. The second magnet 94 can form any geometric shape, irregular shape, and/or pattern. The first magnet 66 can define a corresponding shape. For example, when the second magnet 94 defines a geometric shape (e.g., a rectangle), the first magnet 66 may define the same geometric shape (e.g., a rectangle) to mate with the second magnet 94. Accordingly, the first magnet defines a shape that is complementary to a shape of the second magnet 94. The first magnet 66 is disposed on the underside 38 of the cooking panel 18. Accordingly, the first and second magnets 66, 94 of the magnet assembly 42 (FIG. 5) are mating magnets that retain the HMI 34 to the underside 38 of the cooking panel 18.

Figure 5:
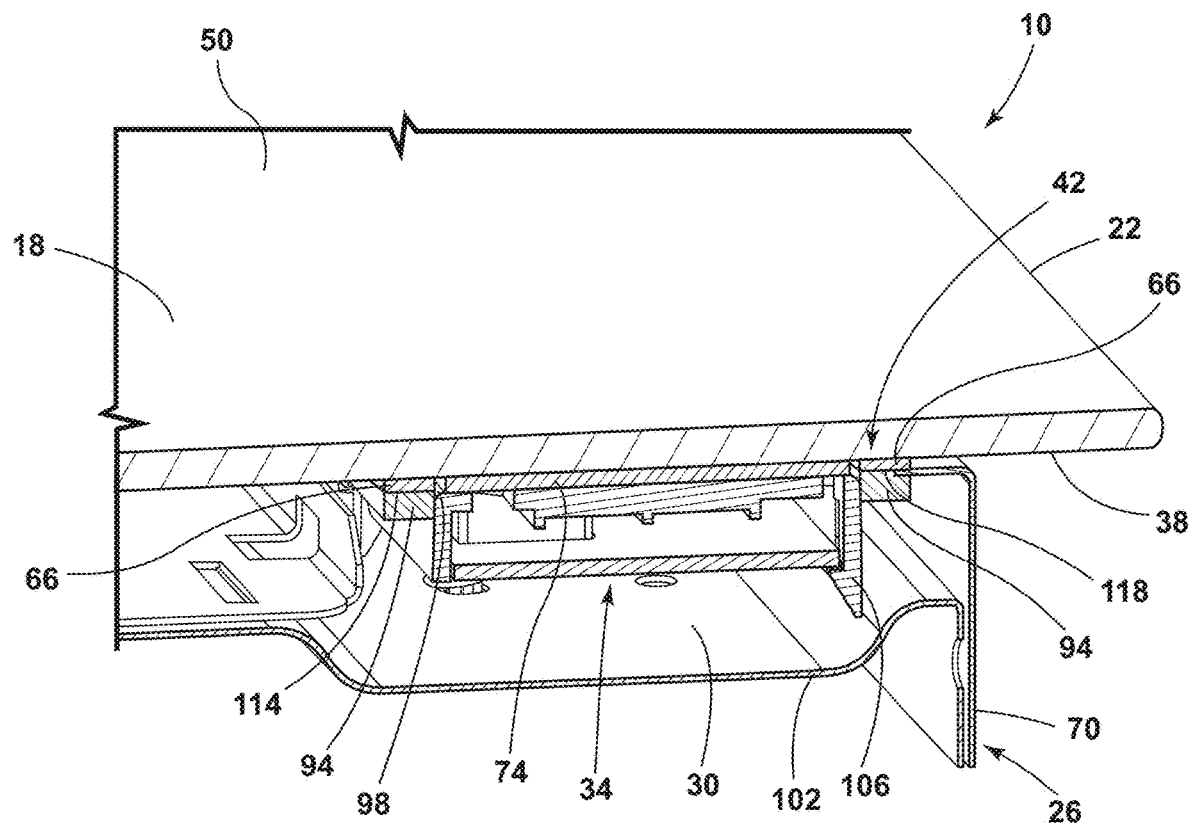
FIG. 5 is a side perspective cross-sectional view of a cooktop assembly having a human-machine interface, according to the present disclosure.
Figure 6:
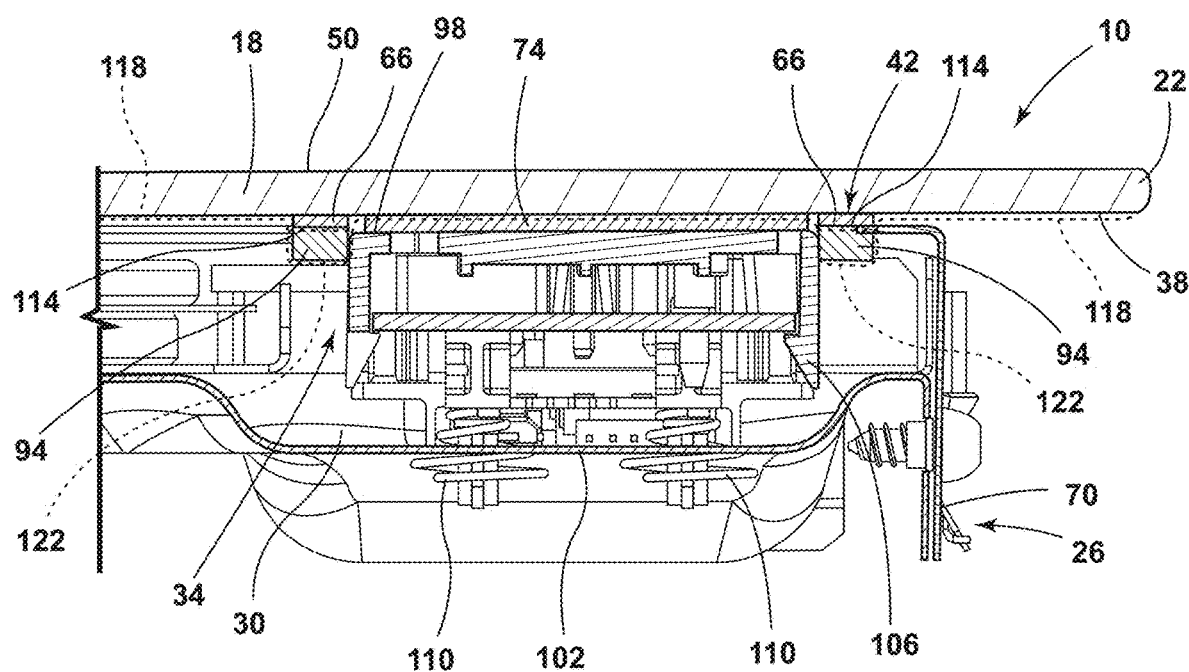
FIG. 6 is a side elevational cross-sectional view of a cooktop assembly having a human-machine interface, according to the present disclosure.

Referring to FIGS. 5 and 6, the HMI 34 is disposed adjacent to the underside 38 of the cooking panel 18 within the cavity 30. The HMI 34 is disposed adjacent to the elongate member 70 proximate the first edge 22 of the cooking panel 18. An interior panel 102 may at least partially define the cavity 30. The interior panel 102 may be substantially parallel to the cooking panel 18. The HMI 34 can extend between the cooking panel 18 and the interior panel 102. The interior panel 102 may be coupled to the support feature 26. As illustrated in FIG. 6, the elongate member 70 is disposed proximate the first edge 22 of the cooking panel 18 and is mechanically fastened to the interior panel 102.

The HMI can include a base 106 with the control panel 74 and/or the indicator lights 82 (FIG. 4) disposed on the base 106. The base 106 extends between the cooking panel 18 and the interior panel 102. According to various aspects, the HMI 34 can include biasing members 110 configured to resiliently support the HMI 34. The biasing members 110 may extend through the interior panel 102 with portions of the biasing members 110 disposed within the cavity 30 on a first side of the interior panel 102 and a portion of the biasing members 110 disposed outside the cavity 30 on the opposing side of the interior panel 102. The biasing members 110 may be configured to bias the HMI 34 toward the cooking panel 18, such that the HMI 34 abuts the underside 38 of the cooking panel 18.

Referring still to FIGS. 5 and 6, the magnet assembly 42 is coupled to both the cooking panel 18 and the HMI 34. The magnet assembly 42 is configured to retain the HMI 34 in a selected position on the underside 38 of the cooking panel 18. The first magnet 66 of the magnet assembly 42 is coupled to the underside 38 of the cooking panel 18. The second magnet 94 of the magnet assembly 42 can be coupled to the HMI 34. The second magnet 94 can extend around the perimeter of the HMI 34, thereby extending around, the control panel 74 and the indicator lights 82. As illustrated, the second magnet 94 may be directly coupled to the base 106 of the HMI 34 adjacent to the control panel 74. The second magnet 94 may be substantially flush with a top of the base 106. The first magnet 66 can extend from the underside 38 of the cooking panel 18 to mate with the second magnet 94. The control panel 74 on the base 106 may be disposed adjacent to a mating interface 114 between the first magnet 66 and the second magnet 94. Accordingly, the control panel 74 can be disposed between two opposing portions of the first magnet 66 and may abut the underside 38 of the cooking panel 18.

The first magnet 66 may be a magnetic member coupled directly to the underside 38 of the cooking panel 18. Alternatively, a film layer 118 may be disposed on the underside 38 of the cooking panel 18. According to various aspects, the first magnet 66 may be included and/or embedded in the film layer 118. The film layer 118 may be a plastic film, such that the first magnet 66 can be laminated to the underside 38 of the cooking panel 18.

The second magnet 94 can be a magnetic component coupled directly to the HMI 34. Alternatively, a film cover 122 may be disposed on the topside 98 of the HMI 34. The second magnet 94 can be included and/or embedded within the film cover 122. The film cover 122 may be a plastic film, such that the second magnet 94 may be laminated to the HMI 34. The magnetic forces between the first magnet 66 and the second magnet 94 may be of a sufficient strength to retain the HMI 34 to the cooking panel 18 through the film layer 118 and/or the film cover 122.

In an additional or alternative non-limiting example, one or both of the first magnet 66 and the second magnet 94 can be included in an insert. The insert can be coupled to the cooking panel 18 and/or the HMI 34, respectively. It is contemplated that the inserts can be fixedly coupled to each of the cooking panel 18 and the HMI 34, or alternatively may be removably coupled to the cooking panel 18 and the HMI 34. In such examples, the first magnet 66 can mate with the second magnet 94 through one or both inserts.

Referring to FIGS. 1-6, the magnet assembly 42 can retain the HMI 34 in the selected position on the underside 38 of the cooking panel 18. The selected position of the HMI 34 is configured to align the selectable features 78 of the control panel 74 with the icons 62 on the topside 50 of the cooking panel 18. Accordingly, the selected position of the HMI 34 may provide increased reliability for the user interacting with the user-interface 54 on the topside 50 of the cooking panel 18.

Figure 7:
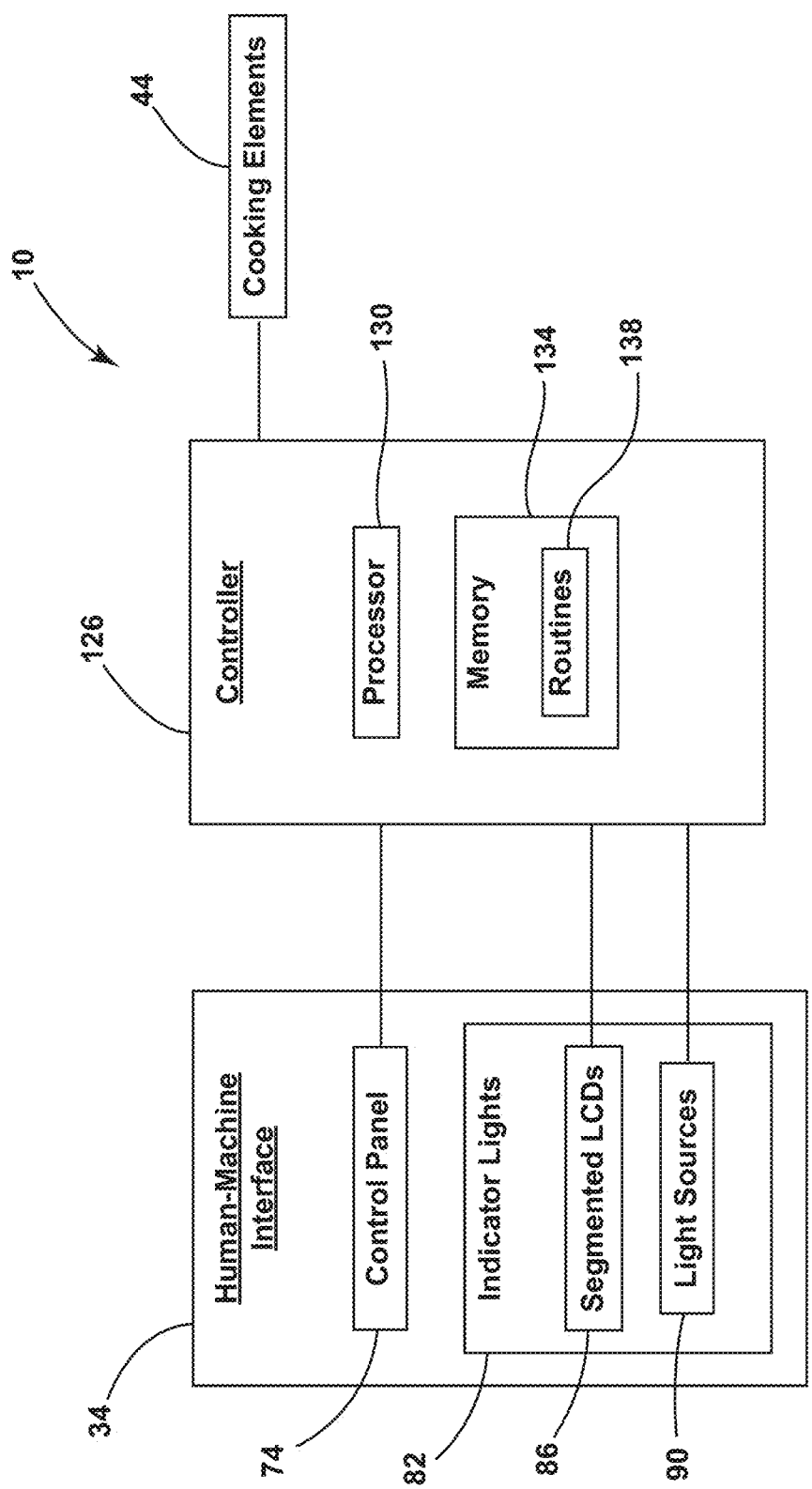
FIG. 7 is a box diagram of an example of a control system of a cooktop assembly, according to the present disclosure.

Referring to FIG. 7, the cooktop assembly 10 can include a controller 126 in communication with the HMI 34 and the cooking elements 44. The controller 126 includes a processor 130, a memory 134, and other control circuitry. Routines 138 are stored in the memory 134 and executable by the processor 130. One or more routines 138 can relate to operations of the cooking elements 44. Additionally, one or more routines 138 can relate to controlling the indicator lights 82, including the segmented LCDs 86 and the light sources 90.

With reference now to FIGS. 1-7, in use, the user can touch, press, or otherwise interact with a selected icon 62 on the topside 50 of the cooking panel 18. The interaction with the icon 62 can be detected by the control panel 74. The selected icon 62 may correspond with one or more of the selectable features 78 of the control panel 74. The control panel 74 can send a signal to the controller 126 in response to the selection of the icon 62. The controller 126 can send a corresponding signal to the respective cooking element 44 or otherwise control the operation of the cooktop assembly 10. Accordingly, the HMI 34 is configured to receive a user selection through the cooking panel 18.

Figure 8:
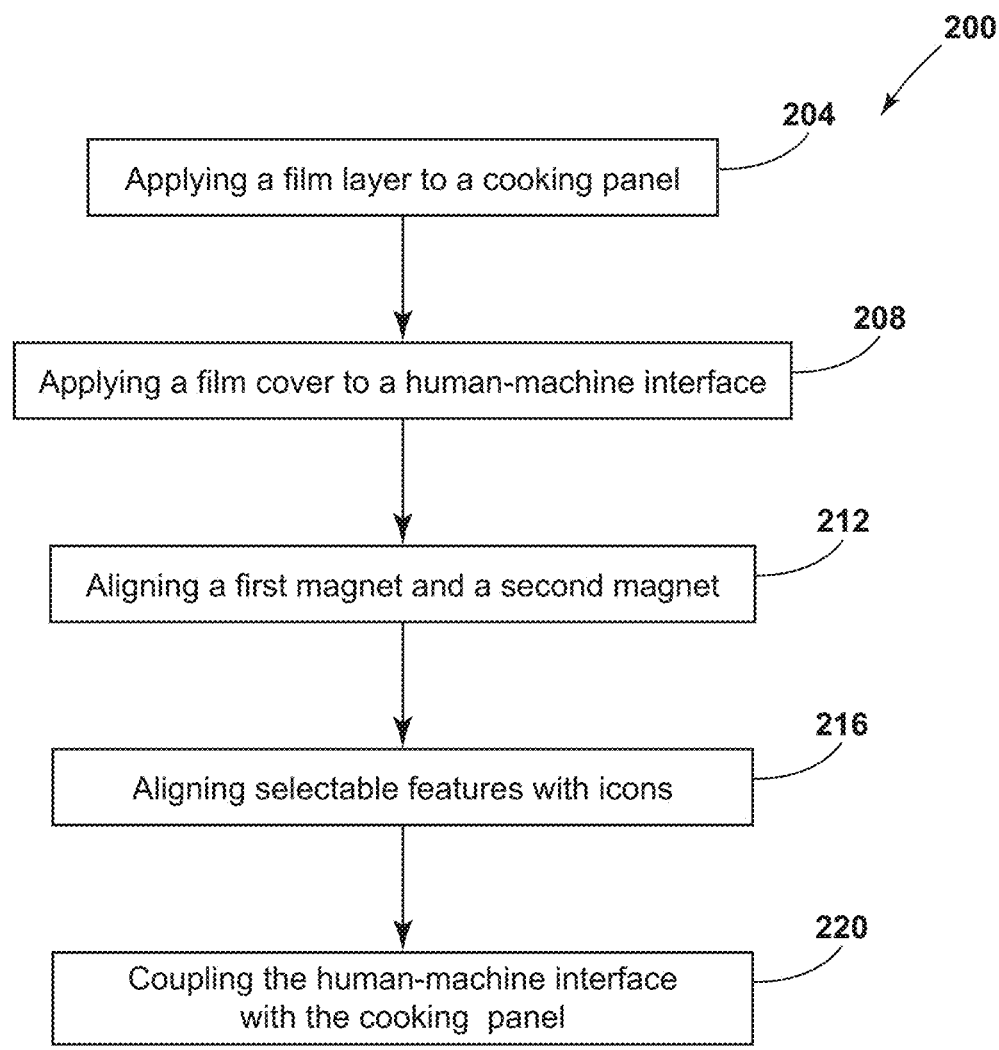
FIG. 8 is a flow diagram of a method for manufacturing a cooktop assembly, according to the present disclosure.

Referring to FIG. 8, and with further reference to FIGS. 1-7, a method 200 of manufacturing the cooktop assembly 10 includes step 204 of applying the film layer 118 to the underside 38 of the cooking panel 18. The film layer 118 may include the first magnet 66 of the magnet assembly 42. Step 204 may also include coupling the first magnet 66 directly to the underside 38 of the cooking panel 18. In step 208, the film cover 122 may be applied to the topside 98 of the HMI 34. The film cover 122 may include the second magnet 94. Step 208 may also include directly coupling the second magnet 94 to the HMI 34.

In step 212, the first magnet 66 can be aligned with the second magnet 94. Generally, the first and second magnets 66, 94 define the same shape, for example, a geometric shape similar to the illustrated rectangular shape. The first magnet 66 and the second magnet 94 mate and engage one another when aligned. It is advantageous to fully align the first magnet 66 with the second magnet 94 to increase the surface area of the mating interface 114. Accordingly, the more accurate the alignment between the first magnet 66 and the second magnet 94, the greater the strength in the engagement between the first magnet 66 and second magnet 94.

In step 216, the selectable feature 78 of the control panel 74 can be aligned with the icons 62 on the topside 50 of the cooking panel 18. The HMI 34 receives the user selection via an interaction between the selected icon 62 and the selectable features 78 of the control panel 74. Accordingly, proper alignment between the icon 62 and the selectable feature 78 increases the accuracy and reliability of the cooktop assembly 10.

In step 220, the HMI 34 may be coupled with the cooking panel 18 by engaging the second magnet 94 with the first magnet 66. In various examples, the magnet assembly 42 may also be coupled to the support feature 26, as best illustrated in FIG. 6. The elongate member 70 disposed proximate the first edge 22 may extend between the first magnet 66 and the second magnet 94. The magnet assembly 42 can magnetically engage the support feature 26. Additionally or alternatively, each of the first magnet 66 and the second magnet 94 can define a notch to accommodate the support feature 26. The engagement of the magnet assembly 42 with the support feature 26 may assist in maintaining the proper alignment of the HMI 34 with the cooking panel 18. The magnet assembly 42 can retain the HMI 34 in the selected position on the underside 38 of the cooking panel 18.

Use of the present disclosure may provide for a variety of advantages. For example, the magnet assembly 42 can retain the HMI 34 on the underside 38 of the cooking panel 18. The magnet assembly 42 can provide proper alignment between the selectable features 78 of the HMI 34 with the icons 62 that are engaged by the user. Further, the magnet assembly 42 can increase the reliability of the operation of the cooktop assembly 10 through the alignment of the icons 62 with the HMI 34. Additionally, the magnet assembly 42 can provide a flexible arrangement for coupling the HMI 34 to the cooking panel 18 that may be free of fixed mechanical attachments. Also, the magnet assembly 42 may accommodate variations in component dimension tolerances. Moreover, the magnet assembly 42 may reduce manufacturing and production costs and time as the HMI 34 can be coupled to the cooking panel 18 manually, in a semi-automatic assembly line, and/or in an automatic assembly line. Further, the magnet assembly 42 can be applied directly to the cooking panel 18 and can provide an abutting relationship between the control panel 74 of the HMI 34 and the cooking panel 18. Additional benefits or advantages of using this device may also be realized and/or achieved.

According to an aspect of the present disclosure, a cooktop for a cooking appliance includes a cooking panel that has a first edge. A support feature is coupled to the cooking panel proximate the first edge. The cooking panel is disposed on the support feature. The support feature and the cooking panel define a cavity. A human-machine interface is coupled to an underside of the cooking panel. The human-machine interface is disposed within the cavity and adjacent to the support feature. A magnet assembly is coupled to the cooking panel and the human-machine interface. The magnet assembly is configured to retain the human-machine interface in a selected position on the underside of the cooking panel.

According to another aspect, a magnet assembly includes a first magnet coupled to an underside of a cooking panel and a second magnet coupled to a topside of a human-machine interface.

According to still another aspect, a second magnet extends around a perimeter of a human-machine interface.

According to yet another aspect, a second magnet forms a shape that is complementary to a shape of a first magnet.

According to another aspect, a human-machine interface includes a touch panel and indicator lights disposed on opposing sides of the touch panel.

According to still another aspect, a magnet assembly extends around indicator lights and a touch panel.

According to yet another aspect, a cooking panel is one of a glass panel, a ceramic panel, and a glass-ceramic panel.

According to another aspect, a human-machine interface is a touch panel configured to receive a user selection through a cooking panel.

According to still another aspect, a magnet assembly is embedded in at least one of a film layer coupled to a cooking panel and a film cover coupled to a human-machine interface.

According to another aspect of the present disclosure, a cooktop assembly includes a cooking panel having a topside and an underside. A first magnet is coupled to the underside of the cooking panel. A human-machine interface has selectable features. The human-machine interface is disposed proximate the underside of the cooking panel. A second magnet is coupled to the human-machine interface. The second magnet is configured to mate with the first magnet to couple the human-machine interface to the cooking panel.

According to another aspect, a film layer is coupled to the underside of the cooking panel. A first magnet is included in the film layer.

According to still another aspect, a film cover is disposed on a topside of the human-machine interface. A second magnet is embedded within the film cover.

According to yet another aspect, a touch panel of a human-machine interface abuts an underside of a cooking panel.

According to another aspect, a touch panel is disposed adjacent to a mating interface between a first magnet and a second magnet.

According to still another aspect, a support feature is disposed proximate a front edge of the cooking panel. The support feature is coupled to a second magnet.

According to yet another aspect, a second magnet extends around a perimeter of a human-machine interface.

According to another aspect, a second magnet defines a shape that is complementary to a shape of a first magnet.

According to still another aspect, a cooking panel includes icons on a topside thereof that correspond and align with selectable features of a human-machine interface.

According to another aspect of the present disclosure, a method of manufacturing a cooktop assembly includes applying a film layer to an underside of a cooking panel. The film layer includes a first magnet. A film cover is applied to a topside of a human-machine interface. The film cover includes a second magnet. The second magnet is aligned with the first magnet. The human-machine interface is coupled to the cooking panel by engaging the second magnet with the first magnet.

According to still another aspect, selectable features of a human-machine interface are aligned with icons on a cooking panel.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooktop for a cooking appliance, comprising:
   a cooking panel having a first edge;
   a support feature coupled to an underside of the cooking panel proximate the first edge, wherein the cooking panel is disposed on and supported by the support feature, and wherein the support feature is configured to couple the cooking panel to said cooking appliance;
   an interior panel coupled to the support feature and extending proximate to the underside of the cooking panel;
   a human-machine interface coupled to the underside of the cooking panel, the human-machine interface including a control panel disposed on a base, wherein the human-machine interface is disposed above the interior panel in a space defined by the support feature, the interior panel, and the cooking panel; and
   a magnet assembly configured to retain the human-machine interface in a selected position on the underside of the cooking panel, and wherein the magnet assembly includes:
      a first magnet coupled to the underside of the cooking panel, the first magnet having a first shape; and
      a second magnet coupled to the human-machine interface and configured to mate with the first magnet, wherein the magnet assembly couples the human-machine interface to the cooking panel by engaging the second magnet with the first magnet, an end of an elongate member of the support feature being coupled between the first magnet and the second magnet to maintain alignment of the human-machine interface with the cooking panel, wherein the second magnet is coupled to an outer surface of the base and flush with a top of the base of the human-machine interface, wherein the control panel directly abuts the underside of the cooking panel and is disposed within a space defined by the first shape of the first magnet, and wherein the second magnet extends around a perimeter of the human-machine interface.

2. The cooktop of claim 1, wherein the second magnet is coupled to a topside of the human-machine interface, and wherein the control panel is disposed adjacent to opposing portions of the first magnet when the first magnet is engaged with the second magnet.

3. The cooktop of claim 2, wherein the second magnet forms a second shape that is complementary to the first shape of the first magnet.

4. The cooktop of claim 1, wherein the human-machine interface includes the control panel and indicator lights, wherein the control panel is configured as a touch panel to receive a user selection through the cooking panel and the indicator lights are disposed on opposing sides of the touch panel.

5. The cooktop of claim 4, wherein the magnet assembly extends around the indicator lights and the touch panel.

6. The cooktop of claim 1, wherein the cooking panel is one of a glass panel, a ceramic panel, and a glass-ceramic panel.

7. The cooktop of claim 1, wherein the magnet assembly is embedded in at least one of a film layer coupled to the cooking panel and a film cover coupled to the human-machine interface.

8. The cooktop of claim 1, further comprising:
   a biasing member extending through the interior panel, wherein the biasing member is configured to bias the human-machine interface toward the cooking panel.

9. The cooktop of claim 1, wherein the interior panel defines a depressed surface, and wherein the human-machine interface is disposed above the depressed surface.

10. A cooktop assembly, comprising:
a cooking panel having a topside and an underside;
a support feature having an elongate member coupled to the underside of the cooking panel;
a first magnet coupled to the underside of the cooking panel;
a human-machine interface having selectable features, wherein the human-machine interface is disposed proximate the underside of the cooking panel; and
a second magnet coupled to the human-machine interface, wherein the second magnet is configured to mate with the first magnet to couple the human-machine interface to the cooking panel, and wherein at least one of the first magnet and the second magnet defines a notch, an end of the elongate member being disposed within the notch and between the first magnet and the second magnet, wherein the notch maintains alignment of the human-machine interface with the cooking panel when the elongate member is disposed therein, further wherein the notch maintains a position relative to the cooking panel when the elongate member is disposed therein.

11. The cooktop assembly of claim 10, further comprising:
a film layer coupled to the underside of the cooking panel, wherein the first magnet is included in the film layer.

12. The cooktop assembly of claim 10, further comprising:
a film cover disposed on a topside of the human-machine interface, wherein the second magnet is embedded within the film cover.

13. The cooktop assembly of claim 10, wherein a touch panel of the human-machine interface abuts the underside of the cooking panel, and wherein the touch panel is disposed between opposing portions of the first magnet when the first magnet is engaged with the second magnet.

14. The cooktop assembly of claim 10, wherein the support feature is disposed proximate a front edge of the cooking panel, and wherein the second magnet is configured to magnetically engage the support feature.

15. The cooktop assembly of claim 10, wherein the second magnet extends around a perimeter of the human-machine interface.

16. The cooktop assembly of claim 10, wherein the second magnet defines a shape that is complementary to a shape of the first magnet.

17. The cooktop assembly of claim 10, wherein the cooking panel includes icons on the topside thereof that correspond and align with the selectable features of the human-machine interface.

18. A method of manufacturing a cooktop assembly, comprising:
applying a film layer to an underside of a cooking panel, wherein the film layer includes a first magnet;
applying a film cover to a topside of a human-machine interface, the human-machine interface including a base, wherein the film cover includes a second magnet disposed along an outer side surface of the base;
aligning the second magnet with the first magnet;
coupling the human-machine interface to the cooking panel by engaging the second magnet with the first magnet and an elongate member coupled therebetween; and
biasing the human-machine interface toward the cooking panel with a biasing member extending from the base and through an interior panel coupled to the elongate member proximate the cooking panel.

19. The method of claim 18, comprising:
aligning selectable features on the human-machine interface with icons on the cooking panel.

20. The method of claim 19, further comprising:
positioning the elongate member within a notch defined by at least one of the first magnet and the second magnet to maintain alignment between the human-machine interface and the cooking panel.

* * * * *